April 13, 1926.

J. JAROSZ

BREAD SLICING MACHINE

Filed April 28, 1925

Inventor

Jan Jarosz.

April 13, 1926.
J. JAROSZ
1,580,376
BREAD SLICING MACHINE
Filed April 28, 1925      2 Sheets-Sheet 2
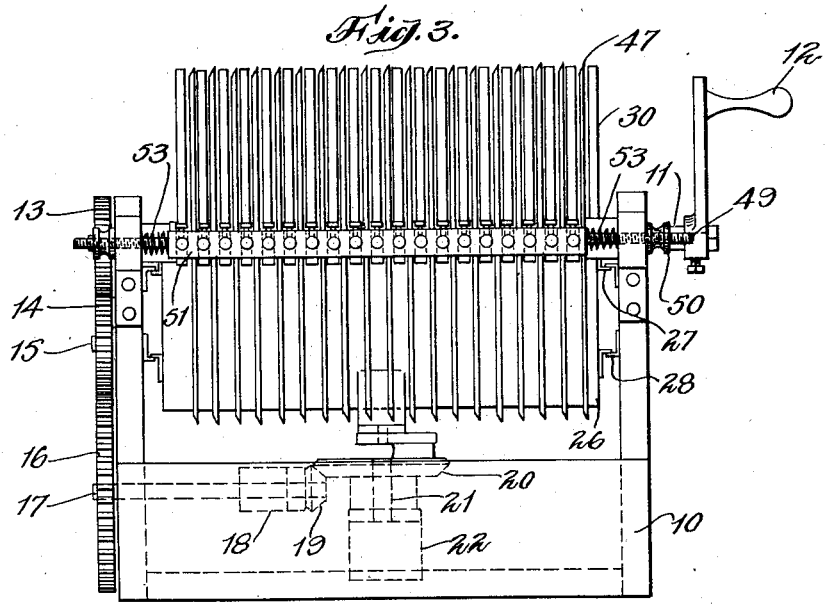
Inventor
Jan Jarosz.

Patented Apr. 13, 1926.

1,580,376

UNITED STATES PATENT OFFICE.

JAN JAROSZ, OF LOWELL, MASSACHUSETTS.

BREAD-SLICING MACHINE.

Application filed April 28, 1925. Serial No. 26,400.

*To all whom it may concern:*

Be it known that I, JAN JAROSZ, a citizen of Poland, and resident of Lowell, in the county of Middlesex and State of Massachusetts, have invented certain new and useful Bread-Slicing Machines, of which the following is a specification.

This invention relates to improvements in bread cutters, and it is the principal object of the invention to provide a bread-cutter adapted to slice a loaf of bread into a plurality of slices at one time.

Another object of the invention is the provision of a bread cutter equipped with a plurality of knives, and with means for holding a loaf of bread adapted to be carried against the knives.

A further object of the invention is the provision of a bread cutter of the above type equipped with means for sharpening the knives.

A still further object of the invention is the provision of a bread cutter having means for adjusting the knife sharpening means to guide them close to the knives during the sharpening process and to hold them separated from the knives during the bread cutting or slicing operation.

The objects of the invention are also to provide a simple bread slicer adapted for ready and convenient operation and equipped with a suitable gearing for transmitting the various motions to the bread carrying and holding means to carry them against the knives, to rotate the knives, and to operate the knife sharpening means.

These and other objects and advantages of my invention will become more fully known as the description thereof proceeds, and will then be specifically defined in the appended claims.

In the accompanying drawings forming a material part of this disclosure:

Fig. 3 is an end view thereof, seen in the direction of the arrows 3—3 of Figure 1.

Figure 1:
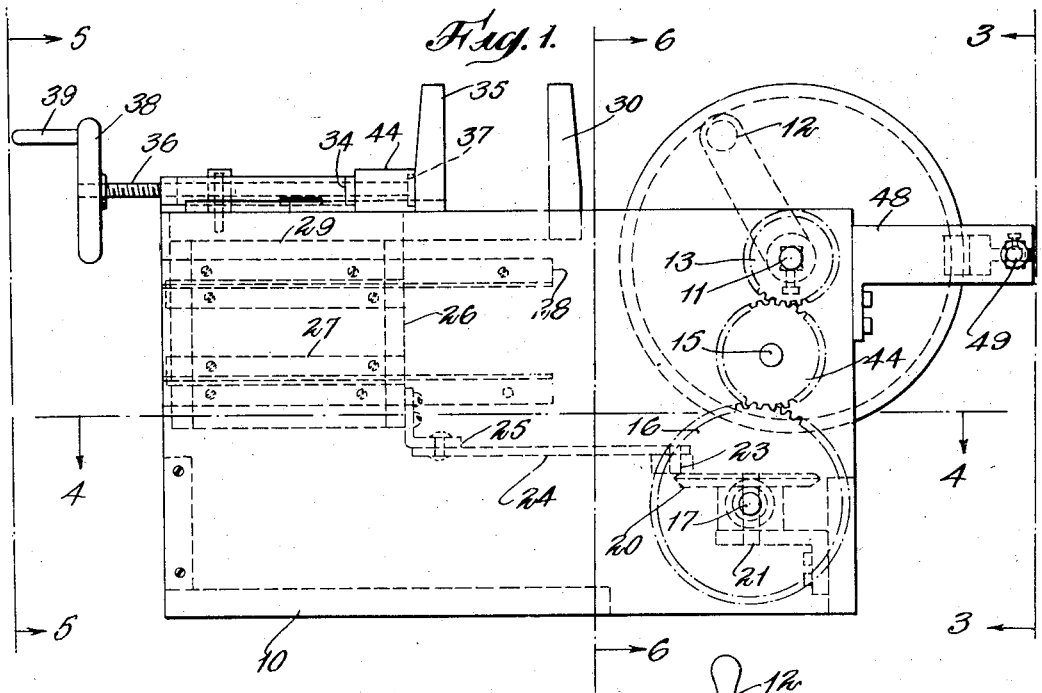
Fig. 1 is a side-elevation of a bread cutter constructed according to the present invention.
Figure 2:
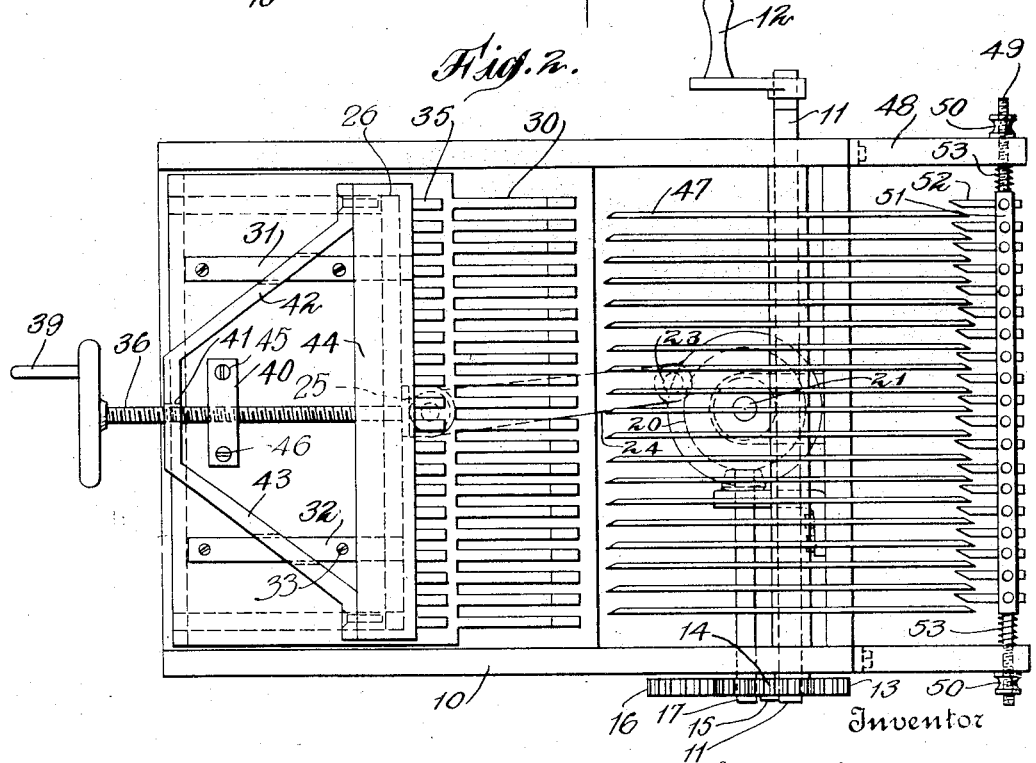
Fig. 2 is a top plan view thereof.

The bread slicer comprises a frame 10 in which a transverse shaft 11 is journalled with its ends projecting beyond the frame which carries at one of its ends a crank 12 for operating the shaft, while its opposite end carries a gear 13 in mesh with a gear 14 on a stub shaft 15 journalled in the frame which in turn meshes with a gear 16 on a shaft 17 also journalled in the frame and extending into the same through a guide bracket 18 and carrying at its inner end a bevel gear 19. This bevel gear meshes with a larger bevel gear 20 on a shaft 21 journaled in a bracket 22 secured to the bottom of the frame.

The bevel gear 20 carries a pin 23 to which a link 24 is pivotally attached, the other end of which is pivotally attached to an eye 25 secured to the rear wall of a carriage 26 having end guide rails 27 attached thereto adapted to slide on similar guide rails 28 attached to the inner frame walls. The carriage has a top plate 29 secured thereto which carries at its rear end a plurality of upstanding fingers or bars 30. Guide rails 31 and 32 are attached to plate 29 by means of screws 33, and over these rails slides a plate 34 carrying at its free end a plurality of upstanding fingers 35 adapted to be advanced against the fingers 30 or withdrawn therefrom by the following means: A screw 36 has its front end connected to the strip 37 carrying the fingers 35 and is guided in a suitable guide in plate 34, and carries at its front end a wheel having an operating handle 39 attached thereto. The screw is guided through a bracket 40 attached to the plate 29, while near the front of plate 29 the screw 36 is passing through a socket 41 connected by diverging bars 42, 43 to the finger plate 44, and bolts 45, 46 connect the frame 41, 42, 43 with the plate 29 of the carriage The slicing knives 47 are carried by a sleeve on shaft 11 suitably spaced from each other adapted to cut the bread held between fingers 30 and 35 carried against the knives by the operation of hand wheel 38.

To the rear part of the frame a bracket 48 is attached in which a shaft 49 is journaled projecting with its threaded ends over the frame which carries adjusting nuts 50. Between the arms of brackets 48, the shaft 49 carries a square sleeve 51 spaced from the bracket arms to which the knife sharpeners 52 are attached one for each knife, and springs 53 are wound about the shaft 49 between the arms of the bracket 48 and the inner ends of the square part 51.

The apparatus operates as follows:

Bread to be sliced or cut is placed between the rows of fingers 30 and 35, and the same is then clamped between these fingers by the proper operation of the screw 36 by means of the wheel 38. Then the crank 12 is turned to rotate shaft 11 and the knives 47 thereon, at the same time through the gearing drawing carriage 26 with the bread held thereon against the knives to be sliced by the latter.

During the slicing operation the sharpeners 52 are normally kept out of engagement with the knives. If a sharpening is desired, they are carried against the knives by the proper adjustment of the nuts 50.

The rotary motion of the gears and shaft 11 is transformed into a reciprocatory one by means of the bevel gears 19, 20 and link 24.

It is to be understood that I have described and shown only one of the numerous forms of execution of my invention into practice, and that such changes may be made in the general arrangement and in the construction of the minor details thereof, as fall within the scope of the appended claims without departure from the principle of the invention.

Having thus described my invention, what I claim as new and desire to secure by Letters Patent is:

1. In a bread cutter of the class described including a frame and a plurality of rotary knives, a means for sharpening said knives, comprising a shaft, a sleeve on said shaft, means for resiliently and adjustably holding said sleeve on said shaft, and a plurality of knife sharpening tools on said sleeve, one for each of said knives.

2. In a bread cutter of the class described including a frame, and a plurality of rotary cutters or knives, a rear extension on said frame, a shaft journaled in said rear extension, projecting with its ends beyond said frame, adjusting nuts on the projecting ends of said shaft, a square sleeve on said shaft within said frame, springs wound about the ends of said shaft between said sleeve and the frame, and a plurality of knife sharpening tools attached to said square sleeve, one for each of said knives.

Signed at Lowell, in the county of Middlesex, and State of Massachusetts, this 22nd day of April A. D. 1925.

JAN JAROSZ.